United States Patent
Guo et al.

(10) Patent No.: US 11,729,305 B2
(45) Date of Patent: Aug. 15, 2023

(54) METHOD AND APPARATUS FOR CONSTRUCTING NOVEL DEVICE

(71) Applicant: BEIJING XIAOMI MOBILE SOFTWARE CO., LTD., Beijing (CN)

(72) Inventors: Bin Guo, Beijing (CN); Junjie Dong, Beijing (CN); Zhao Zhang, Beijing (CN); Yan Xu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 215 days.

(21) Appl. No.: 16/931,404

(22) Filed: Jul. 16, 2020

(65) Prior Publication Data
US 2021/0151204 A1    May 20, 2021

(30) Foreign Application Priority Data
Nov. 18, 2019   (CN) .......................... 201911130248.9

(51) Int. Cl.
| | |
|---|---|
| *H04M 1/72454* | (2021.01) |
| *G16Y 40/30* | (2020.01) |
| *G16Y 20/20* | (2020.01) |
| *H04M 1/72415* | (2021.01) |

(52) U.S. Cl.
CPC ......... *H04M 1/72454* (2021.01); *G16Y 20/20* (2020.01); *G16Y 40/30* (2020.01); *H04M 1/72415* (2021.01)

(58) Field of Classification Search
CPC ... G16Y 40/30; G16Y 20/20; H04M 1/72415; H04M 1/72454
See application file for complete search history.

(56) References Cited

U.S. PATENT DOCUMENTS

| | | | |
|---|---|---|---|
| 8,209,158 B1 | 6/2012 | Fielder et al. | |
| 2011/0035706 A1* | 2/2011 | Kinoshita | ............ G06F 3/0482 |
| | | | 715/835 |
| 2012/0290523 A1 | 11/2012 | Malko et al. | |

(Continued)

FOREIGN PATENT DOCUMENTS

| | | |
|---|---|---|
| CN | 109040200 A | 12/2018 |
| CN | 109582776 A | 4/2019 |

(Continued)

OTHER PUBLICATIONS

China National Intellectual Property Administration, Second office action of Chinese application No. 201911130248.9 issued on May 31, 2022, which is foreign counterpart application of this US application.

(Continued)

*Primary Examiner* — Sherrod L Keaton
(74) *Attorney, Agent, or Firm* — Syncoda LLC; Feng Ma

(57) ABSTRACT

A method for constructing a novel device includes: acquiring function models corresponding to at least one physical device, each of the function models corresponding to a function of one physical device; acquiring a construction rule for a target novel device; and constructing the target novel device on the basis of at least one of the function models according to the construction rule. As such, the novel model device can be obtained by acquiring the function models from the physical device and constructing the function models, such that functions achievable by the physical device are extended.

17 Claims, 9 Drawing Sheets

(56) References Cited

U.S. PATENT DOCUMENTS

| | | | |
|---|---|---|---|
| 2016/0011910 A1* | 1/2016 | Kang | G06F 9/5044 |
| | | | 718/104 |
| 2017/0347283 A1 | 11/2017 | Kodaypak | |
| 2019/0371342 A1* | 12/2019 | Tukka | H04W 52/0229 |
| 2020/0125685 A1* | 4/2020 | Phillips | G06F 3/011 |

FOREIGN PATENT DOCUMENTS

| | | |
|---|---|---|
| CN | 109783859 A | 5/2019 |
| CN | 110442737 A | 11/2019 |
| CN | 110457406 A | 11/2019 |

OTHER PUBLICATIONS

Extended European search report of counterpart EP application No. 20191371.2 dated Jul. 8, 2021.

Xiao Ruowei et al., A Finite-State-Machine model driven service composition architecture for internet of things rapid prototyping; Future Generation Computer Systems, Elsevier Science Publishers. Amsterdam, NL, vol. 99, Apr. 29, 2019, entire document.

Bauer Martin et al., IoT Reference Model; In: "Enabling Things to Talk", Jan. 1, 2013, paragraph [07.3].

First office action of Chinese application No. 201911130248.9 dated Oct. 22, 2021.

\* cited by examiner

METHOD AND APPARATUS FOR CONSTRUCTING NOVEL DEVICE

CROSS-REFERENCE TO RELATED APPLICATION

This application claims priority to Chinese Patent Application No. 201911130248.9 filed on Nov. 18, 2019, the disclosure of which is hereby incorporated by reference in its entirety.

BACKGROUND

With fast development of Internet of Things (IoT) technologies, a data transmission capability between a terminal and a physical device can be achieved by connecting the terminal and the physical device to a cloud. The terminal may control the physical device to execute a specified function by sending a specified instruction.

SUMMARY

The present disclosure relates generally to the field of IoT technologies, and more specifically to a method and apparatus for constructing a novel device.

According to a first aspect of embodiments of the present disclosure, a method for constructing a novel device is provided. The method includes:

acquiring function models corresponding to at least one physical device, each of the function models corresponding to a function of one physical device;

acquiring a construction rule for a target novel device; and constructing the target novel device on the basis of at least one of the function models according to the construction rule.

According to a second aspect of embodiments of the present disclosure, an apparatus for constructing a novel device is provided. The apparatus includes:

a processor; and a memory device configured to store instructions executable by the processor, wherein the processor is configured to:

acquire function models corresponding to at least one physical device, each of the function models corresponding to a function of one physical device;

acquire a construction rule for a target novel device; and construct the target novel device on the basis of at least one of the function models according to the construction rule.

It is to be understood that both the foregoing general description and the following detailed description are exemplary only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
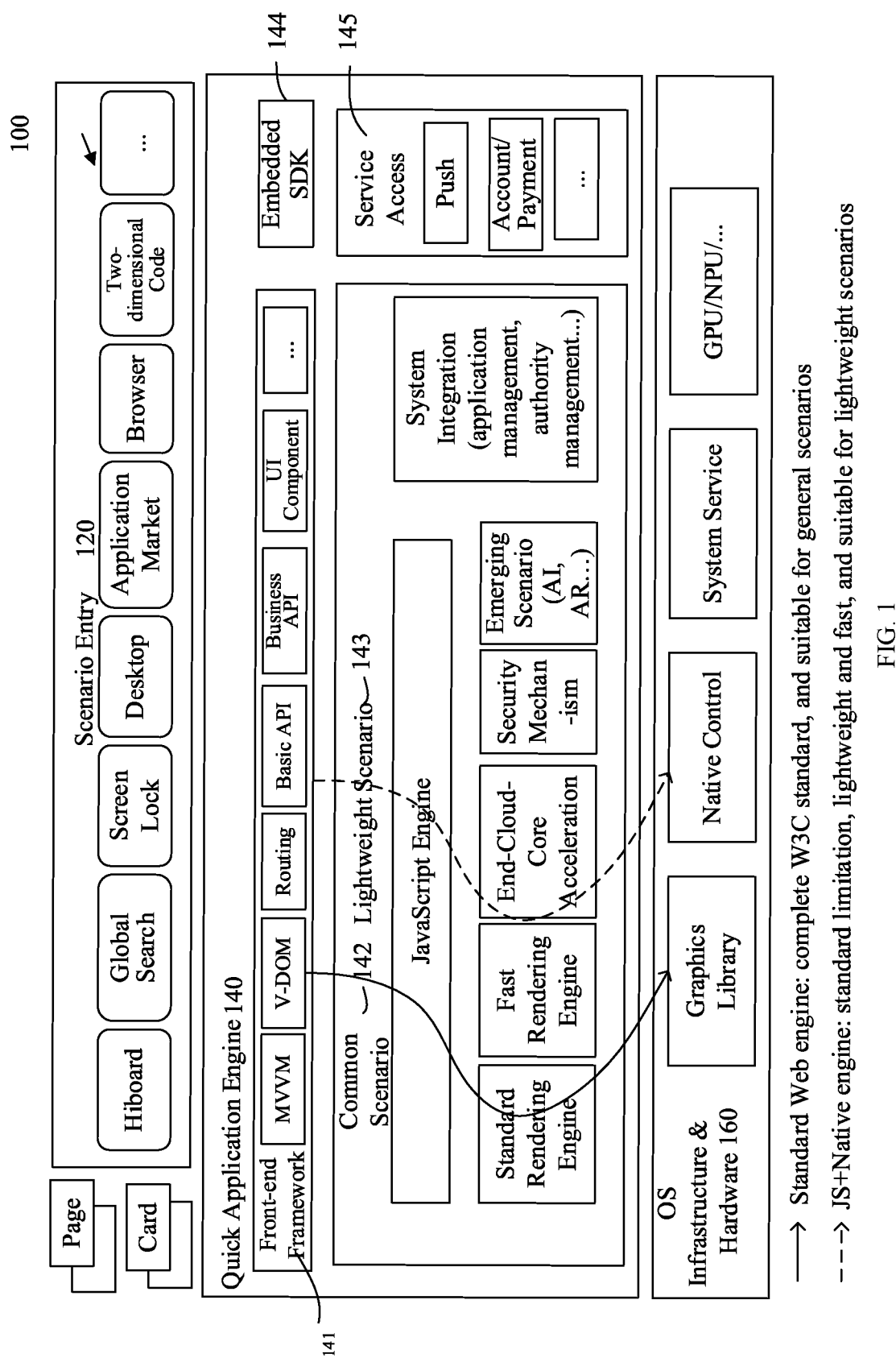
FIG. 1 is a block diagram of a fast application according to some applications.

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the disclosure as recited in the appended claims.

It should be understood that the term "several" used in this text means one or more than one, and the term "a plurality of" means two or more than two. The term "and/or" is merely an association relationship for describing associated objects, which represents that there may exist three types of relationships, for example, A and/or B may represent three situations: only A exists, both A and B exist, and only B exists. In addition, the character "/" herein generally represents an "or" relationship between associated objects before and after the character.

At present, functions executable by the physical device are fixed. As a result, when the terminal controls the physical device, only the functions of the physical device can be achieved. If a novel function is required, it is needed to purchase a device having this function.

For convenience of understanding, the terms involved in the embodiments of the present disclosure are described below.

1) Internet of Things (IoT)

IoT is an information carrier for the Internet, traditional telecommunication networks and the like, and is a network allowing all ordinary objects that can perform independent functions to achieve interconnection and intercommunication. IoT is mainly configured to achieve interconnection between T2T (Thing to Thing), H2T (Human to Thing), and H2H (Human to Human).

2) Artificial Intelligence & Internet of Things (AIoT)

AIoT=AI (Artificial Intelligence)+IoT. AIoT integrates AI technology and IoT technology, generates and collects huge amounts of data through IoT, stores the data in a cloud and at an edge, and achieves datamation and intelligentization of all things through big data analysis and higher forms of AI.

3) Quick Application

As a novel form of application without installation, quick application may be developed by using front-end technology stack, and has the dual advantages of an HTML (HyperText Markup Language) pages and a native application. A user does not need to install the quick application, can immediately use the quick application by clicking it, and thus experiences performance of the native application. By deeply integrating quick application frameworks into mobile phone systems of various manufacturers, a seamless connection between user requirements and application services can be achieved at an operating system level, improving the user experience and the conversion efficiency of the application services.

In an example, the quick application includes a plurality of function modules, including but not limited to a basic function, network access, file data, and the like. Each of the function modules includes a plurality of sub-function modules.

FIG. 1 is a framework diagram of a quick application according to some applications. As shown in FIG. 1, a framework 100 of the quick application includes: a scenario entry 120, a quick application engine 140, and an operating system (OS) infrastructure & hardware 160.

In some embodiments, the scenario entry 120 may be at least one of a HiBoard, a global search, a screen lock, a desktop, an application market, a browser and a two-dimensional code. An external presentation form of the scenario entry 120 may be a page or a card.

The quick application engine 140 includes a front-end framework 141, a common scenario 142, a lightweight scenario 143, an embedded SDK (Software Development Kit) 144, and a service access 145. The front-end framework 141 includes an MVVM (Model-View-View-Model), a V-DOM, routing, a basic API (Application Programming Interface), a business API, a UI (User Interface) component, and the like. The common scenario 142 and the lightweight scenario 143 include a JavaScript engine, a standard rendering engine, a fast rendering engine, an end-cloud-core acceleration, a security mechanism, an emerging scenario (AI, AR (Augmented Reality), etc.), system integration (application management, authority management, etc.), and the like. The service access 145 includes push, account/ payment, and the like. The OS infrastructure & hardware 160 includes a graphics library, a native control, a system service, a GPU (Graphics Processing Unit)/NPU (Neural-network Processing Unit), and the like.

For instance, from the execution path level, standard HTML5 supporting common Web scenarios (usually through a Webview component or customized Webview in the system), and JS (JavaScript)+Native exist to support a lighter and faster experience.

Figure 2:
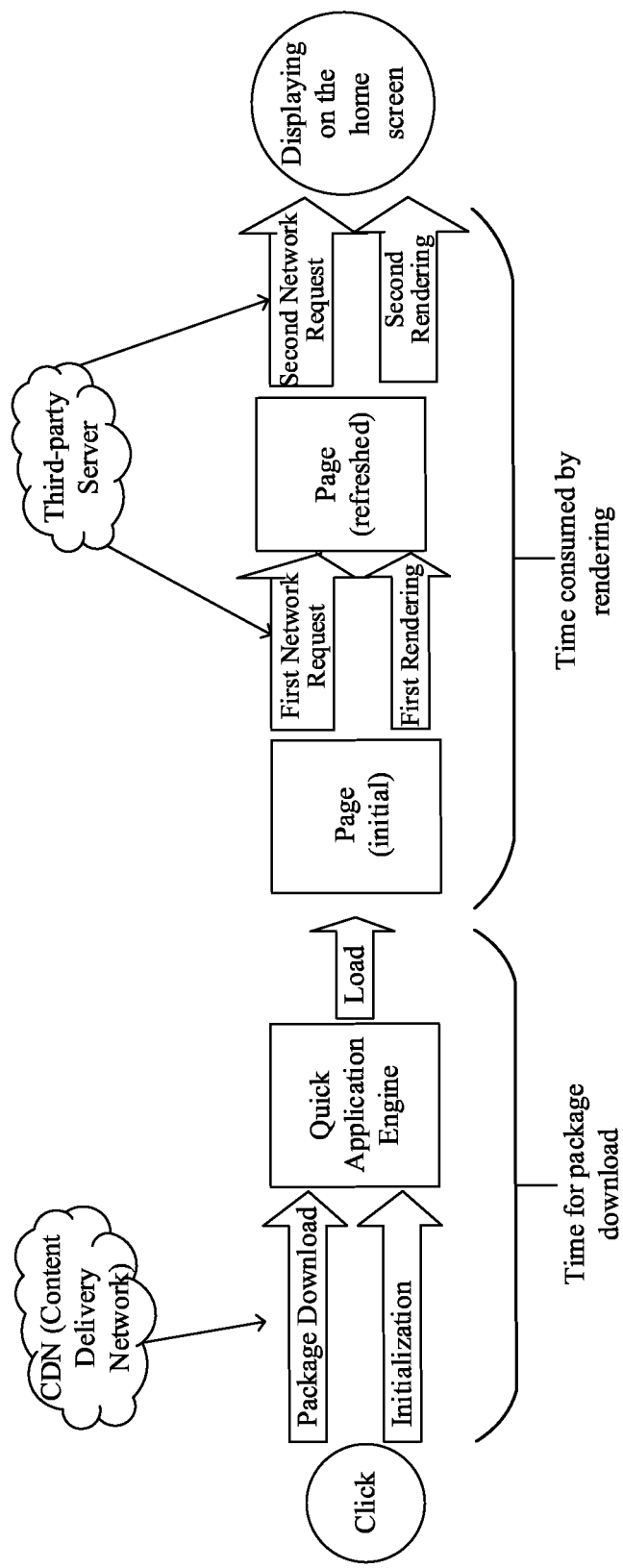
FIG. 2 is a flowchart of starting a quick application according to some applications.

FIG. 2 is a flowchart of starting a quick application according to some applications. The followings are shown in FIG. 2.

1) When the quick application is started for the first time, download of a quick application package is triggered through clicking of the quick application by a user; and at the same time, a quick application engine initializes related operation. After the quick application package is completely downloaded and package verification is completed, a JavaScript file of a first page that the quick application needs to display starts to be loaded, and rendering is started. The download of the package in this process is a bottleneck. According to the measured data in the previous period, the download time of a package of about 200K under a normal network should be at least 400 milliseconds, and 2M packages should be more than 2 seconds.

2) Page rendering includes JavaScript loading, page and JavaScript framework logic execution, layout calculation, and native UI control drawing. There will be one or more network requests (from the page to a third-party server of the application) when logic within the page is executed. Data returned by the network requests drives re-rendering of the page until content of a first screen content is completely displayed.

Here, the network requests, JavaScript execution, typesetting, and drawing are not serial simply but intertwined in parallel to affect the rendering performance of the entire page, and are strongly correlated to page design logic, network status, and a device operation state.

Figure 3:
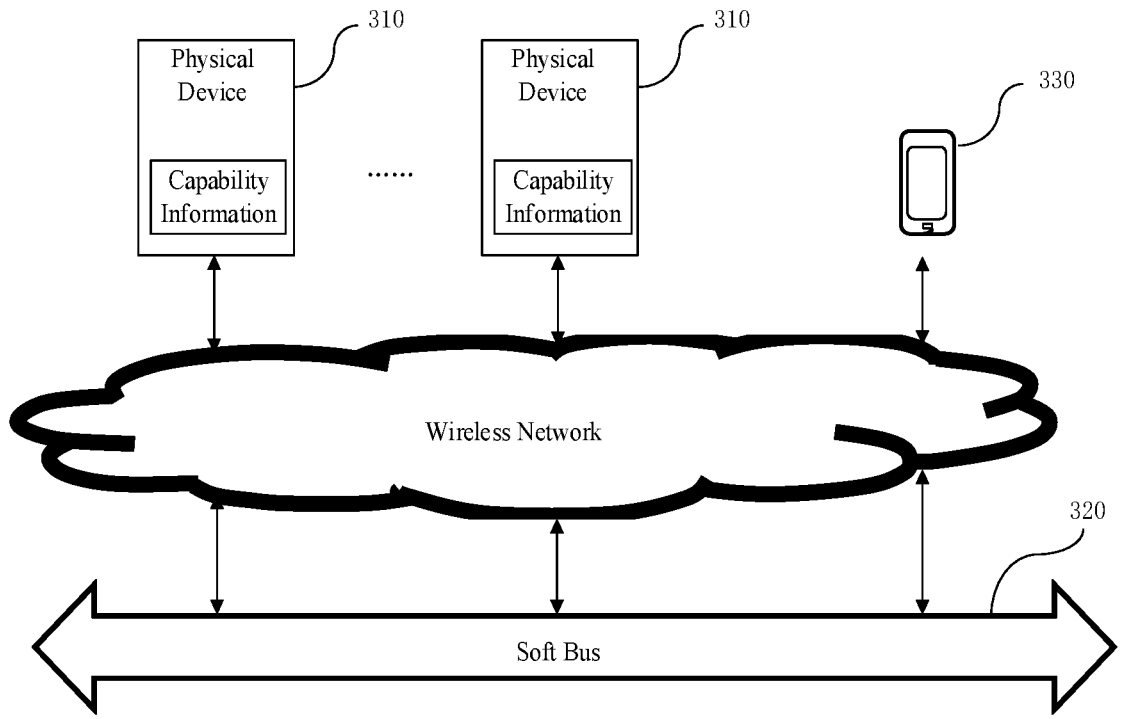
FIG. 3 is a structural diagram for constructing a novel device system according to some applications.

FIG. 3 is a structural diagram for constructing a novel device system according to some applications. As shown in FIG. 3, the novel device system includes at least two physical devices 310, a soft bus 320 and a terminal 330. Any one of the physical devices 310 may access the soft bus 320 through a wireless network.

The physical device 310 may be a terminal or an electronic device having a data transmission capability.

For example, the physical device 310 may be a mobile portable terminal such as a smart phone, a tablet computer and an e-book reader, or an electronic device such as a fan, a TV, a microphone, a speaker and a keyboard.

The physical device 310 may upload its own capability information to the soft bus 320, and the terminal 330 will acquire the capability information on the soft bus 320. Meanwhile, the terminal 330 may parse the acquired capability information, creates a function model corresponding to the capability information, and stores the function model to a memory device of the terminal 330.

In some embodiments, each physical device 310 may access the soft bus through a communication network. In some embodiments, the communication network is a wireless network.

In some embodiments, the above wireless network uses standard communication technology and/or protocol. The network usually refers to the Internet, and may be any other networks, including but not limited to any combination of an LAN (Local Area Network), an MAN (Metropolitan Area Network), a WAN (Wide Area Network), a mobile network, a wireless network, a private network and a virtual private network. In some embodiments, technologies and/or formats including HTML (Hyper Text Mark-up Language), XML (Extensible Markup Language), and the like are configured to represent data exchanged over the networks. In addition, conventional encryption technologies such as SSL (Secure Socket Layer), TLS (Transport Layer Security), VPN (Virtual Private Network), and IPsec (Internet Protocol Security) may be configured to encrypt all or some links. In other embodiments, customized and/or private data communication technologies may be configured to replace or supplement the above data communication technologies.

Figure 4:
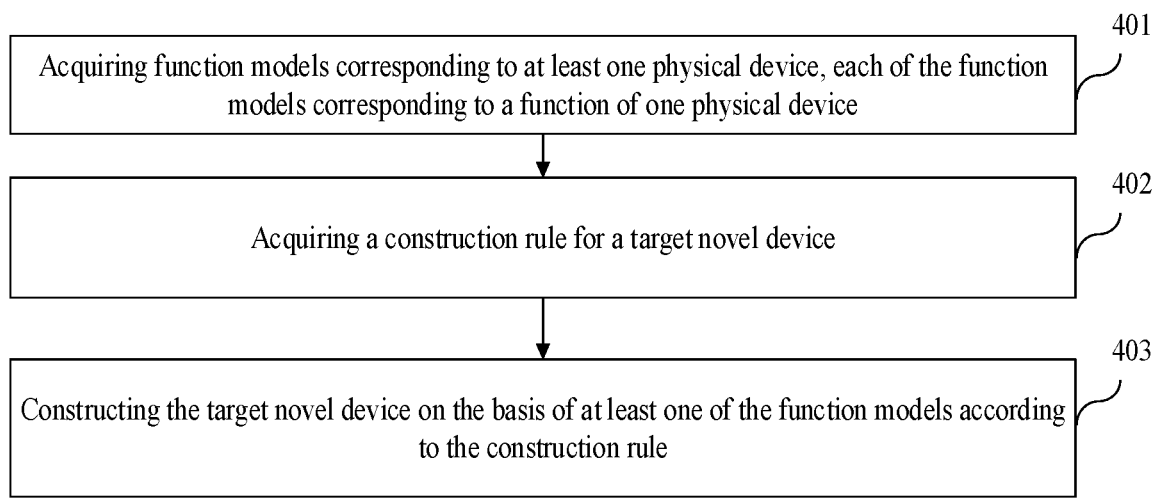
FIG. 4 is a flowchart of a method for constructing a novel device according to some applications.

FIG. 4 is a flowchart of a method for constructing a novel device according to some applications. As shown in FIG. 4, the method for constructing a novel device may be applied to a system including physical devices and a terminal. The physical devices and the terminal respectively access a soft bus, so that each physical device and the terminal may perform information transmission. For instance, the physical device may be the physical device 310 shown in FIG. 3; the soft bus may be the soft bus 320 shown in FIG. 3; the terminal may be the terminal 330 shown in FIG. 3; and method for constructing a novel device is executed by the terminal. The method for constructing a novel device may include the following steps.

In step 401, function models corresponding to at least one physical device are acquired, wherein each of the function models corresponds to a function of one physical device.

In step 402, a construction rule for a target novel device is acquired.

In step 403, the target novel device is constructed on the basis of the at least one of the function models according to the construction rule.

In some embodiments, acquiring the function models corresponding to the at least one physical device includes the following steps.

Respective capability information of the at least two physical devices is acquired, and is configured to indicate at least one function of the physical device that corresponds to the capability information.

The function models are created according to the respective capability information of the at least two physical devices.

In some embodiments, prior to acquiring the construction rule for the target novel device, the method further includes the following steps.

Model requirement information of each of novel devices is acquired, and is configured to indicate a function type of a function model required for constructing the novel device that corresponds to the model requirement information.

At least one novel device whose corresponding model requirement information matches all or part of the function models is determined from the novel devices as a candidate novel device.

The target novel device is determined from the candidate novel device.

In some embodiments, determining the target novel device from the candidate novel device when the candidate novel device includes at least two novel devices includes the following steps.

A novel device construction interface is displayed, and includes a construction trigger control for each of the at least two novel devices.

The novel device corresponding to the construction trigger control that receives a user operation is determined as the target novel device.

In some embodiments, the method further includes the following step.

The at least one function model for constructing the target novel device is selected from the function models according to model requirement information of the target novel device.

The model requirement information is configured to indicate a function type of a function model required for constructing the novel device that corresponds to the model requirement information.

In some embodiments, prior to constructing the target novel device on the basis of the at least one of the function models according to the construction rule, the method further includes the following steps.

A model selection interface of the target novel device is displayed, and includes a model selection control of the at least one function model for constructing the target novel device.

The at least two function models for constructing the target novel device are determined from the function models according to trigger operations on model selection controls of the at least two function models.

In some embodiments, acquiring the construction rule for the target novel device when the target novel device corresponds to at least two function models includes the following step.

A combination rule for the target novel device is acquired, and is configured to indicate a manner for combining the at least two function models in the function models.

Constructing the target novel device on the basis of the at least one of the function models according to the construction rule includes the following step.

At least two function models in the function models are combined into the target novel device according to the combination rule for the target novel device, wherein a device function of the target novel device is achieved by combining functions respectively corresponding to the at least two function models.

In some embodiments, the combination rule for the target novel device includes a connection manner between the at least two function models.

Combining the at least two function models in the function models into the target novel device according to the combination rule for the target novel device includes the following step.

The at least two function models are connected through at least one coordinator according to the connection manner between the at least two function models.

The function model is a state machine model including at least two states, and the coordinator is configured to transmit an instruction for triggering a state change with the at least two function models.

In some embodiments, acquiring the construction rule for the target novel device when the target novel device corresponds to a single function model includes the following step.

A control rule for the target novel device is acquired, and is configured to indicate a manner for controlling the single function model in the function models.

Constructing the target novel device on the basis of the at least one of the function models according to the construction rule includes the following step.

The target novel device is obtained by using a coordinator to connect the single function model, wherein a device function of the target novel device is achieved by controlling the single function model according to the control rule.

In some embodiments, the method further includes the following step.

A control instruction corresponding to a target state is sent to a physical device corresponding to a target model when a state of the target model changes, wherein the control instruction is configured to instruct the physical device to trigger a function corresponding to the target model according to the target state.

The target model is any one of the function models corresponding to the target novel device, and the target state is a state after the target model changes.

In summary, in the method for constructing a novel device provided by some embodiments of the present disclosure, the function models corresponding to the at least one physical device are acquired, wherein each of the function models corresponds to the function of one physical device; then, the construction rule for the target novel device is acquired; and finally, the target novel device is constructed on the basis of the at least one of the function models according to the construction rule. Through the above solution, the novel model device can be obtained by acquiring the function models from the physical device and constructing the function models, so that functions achievable by the physical device are extended.

Figure 5:
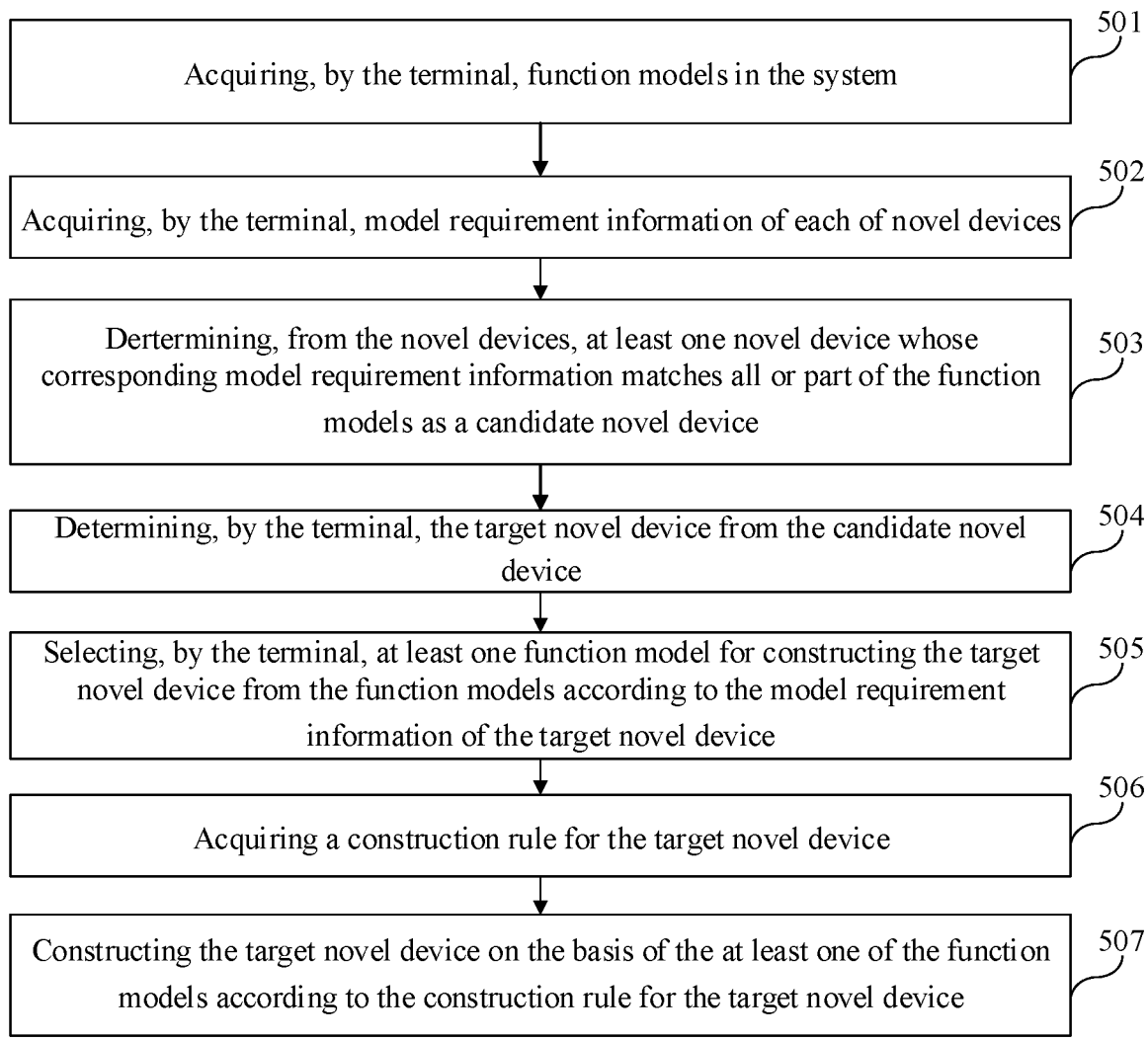
FIG. 5 is a flowchart of a method for constructing a novel device according to some other embodiments.

FIG. 5 is a flowchart of a method for constructing a novel device according to another exemplary embodiment. As shown in FIG. 5, the method for constructing a novel device may be applied to a system including physical devices and a terminal. The physical devices and the terminal respectively access a soft bus, so that each physical device and the terminal in the system may perform information transmission. For instance, the system may be system shown in FIG. 3; the physical device may be the physical device 310 shown in FIG. 3; the soft bus may be the soft bus 320 shown in FIG. 3; the terminal may be the terminal 330 shown in FIG. 3; and the method for constructing a novel device is executed by the terminal. The method for constructing a novel device may include the following steps.

In step 501, the terminal acquires function models in the system.

Each of the function models corresponds to a function of one physical device in the system.

In some embodiments of the present disclosure, in the system including at least two physical devices, the terminal is connected to each of the physical devices in the system through the soft bus so as to achieve information transmission. One function of each physical device in the system corresponds to a kind of capability information, and the capability information in each physical device is used by the terminal for discovery and acquisition.

The terminal acquires the capability information of each of the at least two physical devices. The capability information is configured to indicate at least one function of the physical device that corresponds to the capability information. The terminal creates the function models according to the capability information of each of the at least two physical devices.

For example, in a system including a TV, a smart speaker and a terminal, the TV has functions such as an image playback function and a sound playback function; and the smart speaker has functions such as a voice recognition function and a sound playback function. The terminal, the TV and the smart speaker are connected to the same wireless network. The terminal may establish a connection with the TV and the smart speaker through a soft bus. The terminal may acquire information that the TV has the image playback function and the sound playback function and information that the smart speaker has the voice recognition function and a voice input function. The terminal constructs function models corresponding to the function information according to the acquired function information and stores the function models in a memory device of the terminal. The terminal may create the image playback function model, the sound playback function model, the voice recognition function model and the voice input function model.

In some embodiments, the function modules created by the terminal after acquiring the function information of the physical devices in the system may be displayed on a display interface of the terminal.

The display interface may be a display interface of the terminal system, or an interface of a specific application, or an interface of a quick application.

Figure 6:
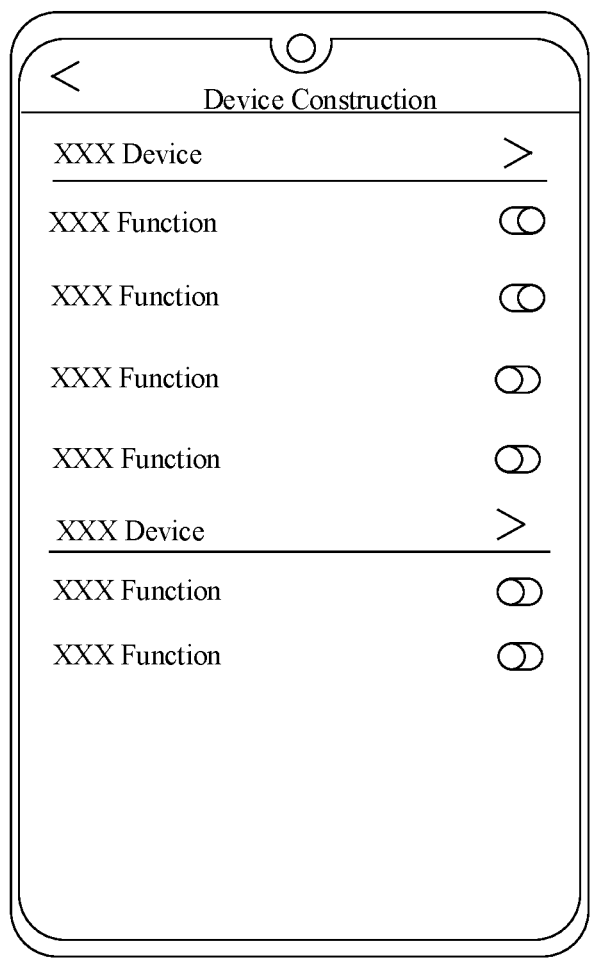
FIG. 6 is a schematic diagram of an interface for constructing a novel device.

For example, FIG. 6 is a schematic diagram of an interface for constructing a novel device involved in some embodiments of the present disclosure. As shown in FIG. 6, function models, which correspond to functions and are created by the terminal after acquiring the function information of each physical device in the system, may be displayed in the form of a list on an interface of a quick application in the terminal.

In step 502, the terminal acquires model requirement information of each of novel devices.

The model requirement information is configured to indicate a function type of a function model required for constructing the novel device that corresponds to the model requirement information.

In some embodiments of the present disclosure, the function models created on the basis of the function information acquired from the system have different function types. In order to construct novel devices with different functions, it is necessary to acquire the function types required by each of the novel devices.

In some embodiments, the requirement information may be customized by the user through the display interface. For instance, the user may enter requirement information in the form of keywords in the novel device construction interface of the quick application.

If the user needs to acquire a novel video playback device with a voice recognition capability, he/she may enter keywords "voice" and "video" in the novel device construction interface of the quick application in the terminal to search all function models with corresponding functions.

Figure 7:
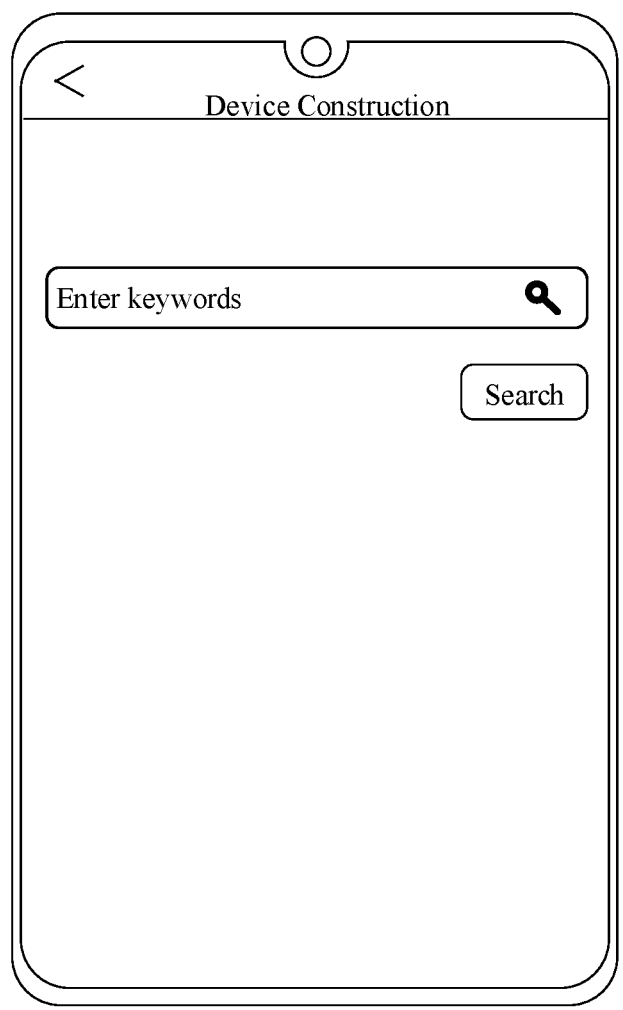
FIG. 7 is a schematic diagram of a function model search interface.

For instance, FIG. 7 is a schematic diagram of a search interface of a function model according to an embodiment of the present disclosure. As shown in FIG. 7, a search area and a triggerable search control are displayed on the novel device construction interface of the terminal. The user may search function types corresponding to requirement information by entering keywords corresponding to the requirement information in the search area and triggering the search control. Search results may be displayed on the interface in the form of a list and are all function models corresponding to the function types.

In step 503, from the novel devices, at least one novel device whose corresponding model requirement information matches all or part of the function models is determined as a candidate novel device.

In some embodiments of the present disclosure, each function model matched to the model requirement information may be acquired through the model requirement information. Function models with similar functions may be replaced with each other to form novel devices having the same functions but corresponding to different physical devices. These novel devices are determined as candidate novel devices.

For example, the above function models include a function model of a function type 1, a function model of a function type 2, a function model of a function type 3, and a function model of a function type 4. For a novel device A, model requirement information of the novel device A indicates that the novel device needs the function model of the function type 1, the function model of the function type 2, and a function model of a function type 5. As there is no function model of the function type 5 in the above function models, the novel device A cannot be determined as the candidate novel device. For another example, for a novel device B, model requirement information of the novel device B indicates that the novel device requires the function model of the function type 1 and the function model of the function type 2. As the above function models include the two function models, the novel device B may be determined as the candidate novel device.

When the plurality of function modules matched to the model requirement information is acquired according to the model requirement information, the function modules may be automatically arranged and combined to form various novel devices; and these novel devices are determined as the candidate novel devices.

In some embodiments, each candidate novel device and information of the physical device corresponding to the function model source of each candidate novel device may be displayed on the display interface of the terminal for the user to select.

For example, in the system having the TV and the smart speaker, an audio and video playback function model of the TV and the voice recognition function model of the smart speaker may be acquired; or the image playback function model of the TV as well as the voice recognition function model and the sound playback function model of the smart speaker may be acquired. At this time, a first novel device, in which the smart speaker performs voice recognition and then the TV performs audio and video playback, may be used as a first candidate novel device; and a second novel device in which the smart speaker performs voice recognition, then the TV performs image playback, and finally, the smart speaker performs sound playback, may be determined as a second candidate novel device. Further, the first and second candidate novel devices and related physical device information may be further displayed on the display interface of the terminal.

In step 504, the terminal determines the target novel device from the candidate novel device.

In some embodiments of the present disclosure, the terminal selects a unique function model combination solution as a solution for achieving the final novel device.

In some embodiments, the terminal displays a novel device construction interface.

The novel device construction interface includes a construction trigger control for each of the at least two novel devices.

In some embodiments, the terminal determines the novel device corresponding to the construction trigger control that receives a user operation as the target novel device. In the novel device construction interface of the terminal, the corresponding construction trigger control is arranged near the display position of each of the candidate novel devices. The user selects one of the candidate novel devices as the target novel device by operating the corresponding construction trigger control.

Figure 8:
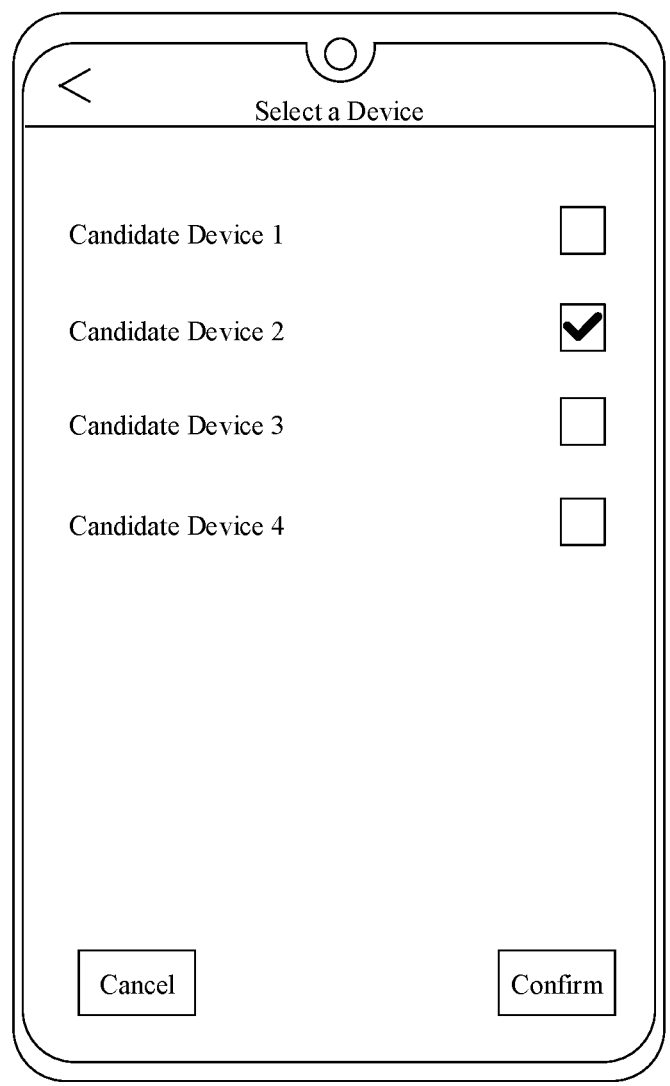
FIG. 8 is a schematic diagram of a target novel device selection interface.

For instance, FIG. 8 is a schematic diagram of a target novel device selection interface involved in some embodiments of the present disclosure. As shown in FIG. 8, the user determines candidate devices 1, 2, 3 and 4 that matches all or part of the function models in the novel devices as candidate novel devices by searching the requirement information. The construction trigger control corresponding to each candidate novel device may be displayed on the right side of the candidate novel device. The user may select one of the candidate novel devices as the target novel device by triggering the corresponding construction trigger control. As shown in FIG. 8, the user selects the candidate device 2 as the target novel device. The user completes the selection and determination of the target novel device by triggering a confirmation control on the display interface of the terminal.

In step 505, the terminal selects at least one function model for constructing the target novel device from the function models according to the model requirement information of the target novel device.

In some embodiments of the present disclosure, the terminal may directly select at least one function model corresponding to a function type from the function models according to the function type indicated by the model requirement information of the target novel device.

In some embodiments, the terminal may display a model selection interface of the target novel device, and determine the at least one function model for constructing the target novel device from the function models according to a trigger operation on a model selection control of the at least one function model.

The model selection interface includes a model selection control of the at least one function model for constructing the target novel device.

Figure 9:
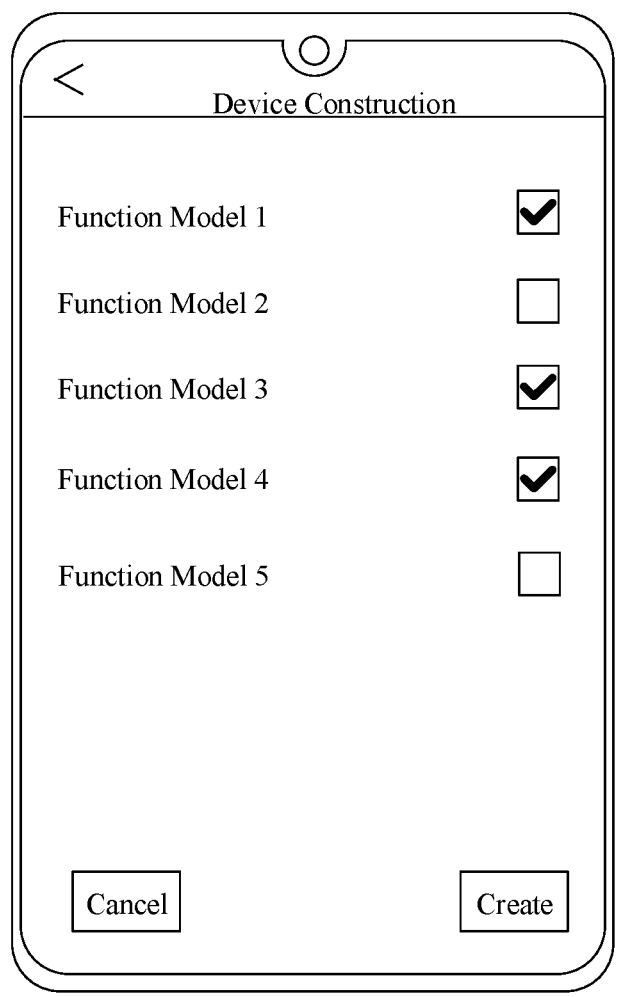
FIG. 9 is a schematic diagram of a target novel device construction interface.

For instance, when the terminal displays the model selection interface, the model selection control may be arranged at a position corresponding to each function module; and the user may select a corresponding function model through the model selection control according to the model requirement information of the target novel device. For example, FIG. 9 is a schematic diagram of a target novel device construction interface according to an embodiment of the present disclosure. As shown in FIG. 9, the terminal displays function models that match the model requirement information on the novel device construction interface according to the model requirement information of the target novel device. The functions models are function models 1, 2, 3, 4 and 5. The user may select at least one function model by triggering the construction trigger control corresponding to the function model. As shown in FIG. 9, the user selects the function models 1, 3 and 4 to be combined, and triggers the creation control displayed at the bottom of the novel device construction interface to complete the construction of the target novel device.

In some embodiments, the user may issue a voice instruction to select a corresponding function model to construct the target novel device.

For instance, when the user needs a desk lamp that can change the brightness of the light regularly, the user may give a voice instruction "dimming the light after three minutes." The terminal automatically analyzes keyword information in the voice instruction, and selects corresponding function types, namely, a timekeeping and timing function type and a brightness adjustment function type, according to the model requirement information obtained after the analysis. The terminal automatically selects any one of function models of the timekeeping and timing function type and any one of function models of the brightness adjustment function type to construct the target novel device.

In some embodiments, the user may give a gesture instruction to select a corresponding function model to construct the target novel device.

For instance, when there are multiple function models corresponding to one function type displayed on the terminal, the user may give a gesture instruction of a corresponding sequence number to select a function model of the corresponding sequence number to construct the target novel device.

In some embodiments of the present disclosure, there may be multiple function models corresponding to the same function type in the function models. At this time, during construction of the target novel device, for the function models of a certain function type required by the target novel device, the user may select one of the function models of this function type for constructing the target novel device.

For instance, if the target novel device needs one type of function model having an audio and video playback function, there may be two function models having this function. For example, one function model is the function model 1 constructed on the basis of capabilities of a TV, and the other function model is the function model 2 constructed on the basis of capabilities of a projector. At this time, the terminal may display controls corresponding to the function models having the audio and video playback function in the model selection interface. When the user triggers the controls, a list including options of the function models 1 and 2 may be displayed. The user determines the function models 1 and 2 as the function models having the audio and video playback function in the target novel device through the selection operation in the list. The user may select and determine the function models of different function types in the target novel device in the manner described above.

In step 506, a construction rule for the target novel device is acquired.

In some embodiments of the present disclosure, the construction rule is configured to indicate a manner for combining the at least two function models in the function models.

The construction rule for the target novel device includes a connection manner between the at least two function models.

The construction rule for the target novel device is determined according to a function required to be achieved by the target novel device.

In some embodiments, the two function models may be directly connected, or a device formed by connecting and combining function models may be connected to another function model.

For instance, the target novel device is a smart voice-controlled and remote-display doorbell. The construction rule for the target novel device may be as follows: a smart doorbell function model and a remote display function model are combined to form a novel device of a smart remote-display doorbell; and the novel device of the smart remote-display doorbell and a voice-controlled function model are combined to form the target novel device.

In step 507, the target novel device is constructed on the basis of the at least one of the function models according to the construction rule for the target novel device.

When the target novel device corresponds to at least two function models, the at least two function models in the function models are combined into the target novel device according to the combination rule for the target novel device.

The combination rule for the target novel device is acquired, and is configured to indicate a manner for combining the at least two function models in the function models. The at least two function models in the function models are combined into the target novel device according to the combination rule for the target novel device, wherein a device function of the target novel device is achieved by combining functions corresponding to the at least two function models.

In some embodiments, the at least two function models are connected through a coordinator according to the connection manner between the at least two function models.

The function model is a state machine model including at least two states, and the coordinator is configured to transmit an instruction for triggering a state change between the at least two function models.

In some embodiments, the coordinator may be configured to connect a function model or another coordinator.

For instance, the terminal acquires a function model 1 from a physical device A, and a function model 2 from a physical device B. The function models 1 and 2 are connected through a coordinator A. If the terminal acquires function models 3 and 4, which are required to be combined into the above function models, from a physical device C, the function models 3 and 4 are connected through a coordinator B. The coordinators A and B are connected through a coordinator C.

In some embodiments of the present disclosure, a control instruction corresponding to a target state is sent to a physical device corresponding to a target model when a state of the target model changes, wherein the control instruction is configured to instruct the physical device to trigger a function corresponding to the target model according to the target state.

The target model is any one of the at least two function models. The target state is a state after the target model changes. The device function of the target novel device is achieved by combining the corresponding functions of the at least two function models.

When the target novel device corresponds to a single function model, a control rule for the target novel device is acquired. The control rule is configured to indicate a manner for controlling the single function model in the function models. The target novel device is obtained by using a coordinator to connect the single function model. A device function of the target novel device is achieved by controlling the single function model according to the control rule.

For instance, when the target novel device is a desk lamp device that can flash at regular intervals, the terminal may acquire a desk lamp lighting function model and a control rule of turning on or off at the regular intervals to instruct and control the desk lamp to turn or off and light at the regular intervals, achieving the target novel device of the desk lamp device that can flash at the regular intervals.

As such, in the method for constructing a novel device provided by some embodiments of the present disclosure, the function models corresponding to the at least one physical device are acquired, wherein each of the function models corresponds to the function of one physical device; then, the construction rule for the target novel device is acquired; and finally, the target novel device is constructed on the basis of the at least one of the function models according to the construction rule. Through the above solution, the novel model device can be obtained by acquiring the function models from the physical device and constructing the function models, so that functions achievable by the physical device are extended.

Figure 10:
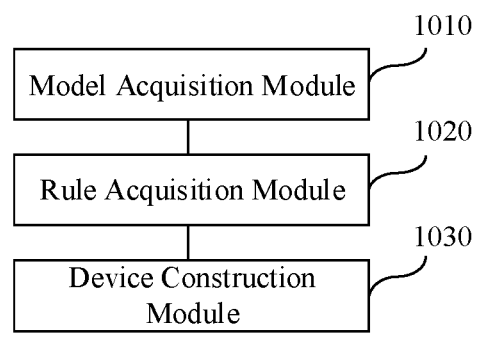
FIG. 10 is a block diagram showing an apparatus for constructing a novel device according to some embodiments.

FIG. 10 is a block diagram showing an apparatus for constructing a novel device according to some applications. As shown in FIG. 10, the apparatus for constructing a novel device may be applied to a system including at least two physical devices and a terminal. The at least two physical devices and the terminal respectively access a soft bus, so that each physical device and the terminal in the system may perform information transmission. For example, the system may be system shown in FIG. 3; the physical device may be the physical device 310 shown in FIG. 3; the soft bus may be the soft bus 320 shown in FIG. 3; and the terminal may be the terminal 330 shown in FIG. 3. An example in which the apparatus is applied to the system is taken. As shown in FIG. 10, the apparatus for constructing a novel device may include the following modules.

A model acquisition module 1010 is configured to acquire function models corresponding to at least one physical device, wherein each of the function models corresponds to a function of one physical device.

A rule acquisition module 1020 is configured to acquire a construction rule for a target novel device.

A device construction module 1030 is configured to construct the target novel device on the basis of at least one of the function models according to the construction rule.

In some embodiments, the model acquisition module 1010 includes an information acquisition sub-module and a model creation sub-module.

The information acquisition sub-module is configured to acquire capability information of each of the at least two physical devices, wherein the capability information is configured to indicate at least one function of the physical device that corresponds to the capability information.

The model creation sub-module is configured to create the function models according to the capability information of each of the at least two physical devices.

In some embodiments, the apparatus further includes the following modules.

A requirement acquisition module is configured to acquire model requirement information of each of novel devices prior to the acquisition of the construction rule for the target novel device, wherein the model requirement information is configured to indicate a function type of a function model required for constructing the novel device that corresponds to the model requirement information.

A candidate device determination module is configured to determine, from the novel devices, at least one novel device whose corresponding model requirement information matches all or part of the function models as a candidate novel device.

A target device determination module is configured to determine the target novel device from the candidate novel device.

In some embodiments, the target device determination module includes an interface display sub-module and a target device determination sub-module.

The interface display sub-module is configured to display a novel device construction interface when the candidate novel device includes at least two novel devices, wherein the novel device construction interface includes a construction trigger control for each of the at least two novel devices.

The target device determination sub-module is configured to determine the novel device corresponding to the construction trigger control that receives a user operation as the target novel device.

In some embodiments, the apparatus further includes the following module.

A model selection module is configured to select the at least one function model for constructing the target novel device from the function models according to model requirement information of the target novel device.

The model requirement information is configured to indicate a function type of a function model required for constructing the novel device that corresponds to the model requirement information.

In some embodiments, the apparatus further includes the following modules.

A selection interface display module is configured to display a model selection interface of the target novel device prior to the construction of the target novel device on the basis of the at least one of the function models according to the construction rule, wherein the model selection interface includes a model selection control of the at least one function model for constructing the target novel device.

A model determination module is configured to determine the at least two function models for constructing the target novel device from the function models according to trigger operations on model selection controls of the at least two function models.

In some embodiments, the rule acquisition module 1020 includes a combination rule acquisition sub-module.

The combination rule acquisition sub-module is configured to acquire a combination rule for the target novel device when the target novel device corresponds to at least two function models, wherein the combination rule is configured to indicate a manner for combining the at least two function models in the function models.

The device construction module 1030 includes the following a device combination sub-module.

The device combination sub-module is configured to combine the at least two function models in the function models into the target novel device according to the combination rule for the target novel device, wherein a device function of the target novel device is achieved by combining functions corresponding to the at least two function models.

In some embodiments, the combination rule for the target novel device includes a connection manner between the at least two function models.

The device combination sub-module includes a model connection sub-module.

The model connection sub-module is configured to connect the at least two function models through at least one coordinator according to the connection manner between the at least two function models.

The function model is a state machine model comprising at least two states, and the coordinator is configured to transmit an instruction for triggering a state change with the at least two function models.

In some embodiments, the rule acquisition module 1020 includes a control rule acquisition sub-module.

The control rule acquisition sub-module is configured to acquire a control rule for the target novel device when the target novel device corresponds to a single function model, wherein the control rule is configured to indicate a manner for controlling the single function model in the function models.

The device construction module 1030 includes a device obtaining sub-module.

The device obtaining sub-module is configured to obtain the target novel device by using a coordinator to connect the single function model, wherein a device function of the target novel device is achieved by controlling the single function model according to the control rule.

In some embodiments, the apparatus can further include the following modules.

An instruction sending module is configured to send a control instruction corresponding to a target state to a physical device corresponding to a target model when a state of the target model changes, wherein the control instruction is configured to instruct the physical device to trigger a function corresponding to the target model according to the target state.

The target model is any one of the function models corresponding to the target novel device, and the target state is a state after the target model changes.

It should be noted that, the function realization of the device provided by the above embodiments is only illustrated by example of divided functional modules as the above-mentioned. While in practice, the above functions may be assigned to different modules to be achieved according to actual needs. That is, the internal structure of the device may be divided into different functional modules, so as to achieve all or part of the functions described above.

With respect to the apparatus in the above embodiments, the specific manners for individual modules in the apparatus to perform operations have been described in detail in the embodiments of the related methods, and will not be elaborated herein.

Some applications of the present disclosure provide an apparatus for constructing a novel device. The apparatus for constructing a novel device may be implemented as all or part of a terminal through hardware or a combination of software and the hardware, and may achieve all or part of steps in any one of the above embodiments in FIGS. 4 and 5. The method for constructing a novel device may be applied to a system including at least two physical devices and a terminal. The at least two physical devices and the terminal respectively access a soft bus, so that each physical device and the terminal in the system may perform information transmission. For example, the system may be system shown in FIG. 3; the physical device may be the physical device 310 shown in FIG. 3; the soft bus may be the soft bus 320 shown in FIG. 3; and the terminal may be the terminal 330 shown in FIG. 3. An example in which the apparatus is applied to the system is taken. The apparatus for constructing a novel device further includes a processor and a memory device for storing instructions by the processor.

The processor is configured to:

acquire function models corresponding to at least one physical device, each of the function models corresponding to a function of one physical device;

acquire a construction rule for a target novel device; and construct the target novel device on the basis of at least one of the function models according to the construction rule.

In some embodiments, acquiring the function models corresponding to the at least one physical device includes the following steps.

Capability information of each of the at least two physical devices is acquired, wherein the capability information is configured to indicate at least one function of the physical device that corresponds to the capability information.

The function models are created according to the capability information of each of the at least two physical devices.

In some embodiments, prior to acquiring the construction rule for the target novel device, the method for constructing a novel device further includes the following steps.

Model requirement information of each of novel devices is acquired, and is configured to indicate a function type of a function model required for constructing the novel device that corresponds to the model requirement information.

From the novel devices, at least one novel device whose corresponding model requirement information matches all or part of the function models is determined as a candidate novel device.

The target novel device is determined from the candidate novel device.

In some embodiments, determining the target novel device from the candidate novel device when the candidate novel device includes at least two novel devices includes the following steps.

A novel device construction interface is displayed, and includes a construction trigger control for each of the at least two novel devices.

The novel device corresponding to the construction trigger control that receives a user operation is determined as the target novel device.

In some embodiments, the method further includes the following step.

The at least one function model for constructing the target novel device is selected from the function models according to model requirement information of the target novel device.

The model requirement information is configured to indicate a function type of a function model required for constructing the novel device that corresponds to the model requirement information.

In some embodiments, prior to constructing the target novel device on the basis of the at least one of the function models according to the construction rule, the method further includes the following steps.

A model selection interface of the target novel device is displayed, and includes a model selection control of the at least one function model for constructing the target novel device.

The at least two function models for constructing the target novel device are determined from the function models according to trigger operations on model selection controls of the at least two function models.

In some embodiments, acquiring the construction rule for the target novel device when the target novel device corresponds to the at least two function models includes the following step.

A combination rule for the target novel device is acquired, and is configured to indicate a manner for combining the at least two function models in the function models.

Constructing the target novel device on the basis of the at least one of the function models according to the construction rule includes the following step.

The at least two function models in the function models are combined into the target novel device according to the combination rule for the target novel device, wherein a device function of the target novel device is achieved by combining functions corresponding to the at least two function models.

In some embodiments, the combination rule for the target novel device includes a connection manner between the at least two function models.

Combining the at least two function models in the function models into the target novel device according to the combination rule for the target novel device includes the following step.

The at least two function models are connected through at least one coordinator according to the connection manner between the at least two function models.

The function model is a state machine model comprising at least two states, and the coordinator is configured to transmit an instruction for triggering a state change between the at least two function models.

In some embodiments, acquiring the construction rule for the target novel device when the target novel device corresponds to a single function model includes the following step.

A control rule for the target novel device is acquired, and is configured to indicate a manner for controlling the single function model in the function models.

Constructing the target novel device on the basis of the at least one of the function models according to the construction rule includes the following step.

The target novel device is obtained by using a coordinator to connect the single function model, wherein a device function of the target novel device is achieved by controlling the single function model according to the control rule.

In some embodiments, the method further includes the following step.

A control instruction corresponding to a target state is sent to a physical device corresponding to a target model when a state of the target model changes, and is configured to instruct the physical device to trigger a function corresponding to the target model according to the target state.

The target model is any one of the function models corresponding to the target novel device, and the target state is a state after the target model changes.

Figure 11:
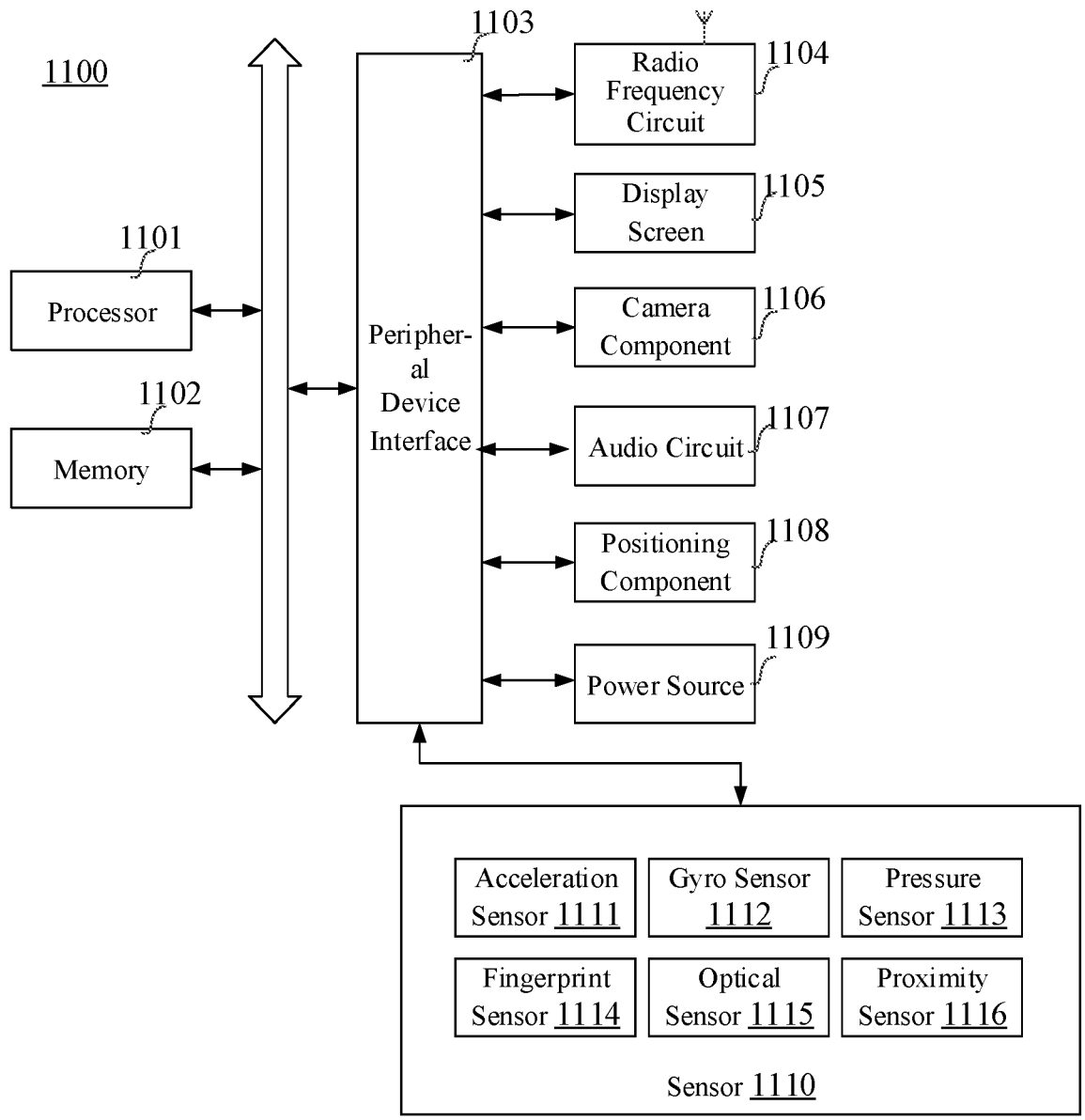
FIG. 11 shows a structural block diagram of a terminal provided by some applications of the present disclosure.

FIG. 11 is a structural block diagram of a terminal 1100 in accordance with one embodiment of the present disclosure. The terminal may be realized as the terminals 330 in FIG. 3.

Generally, the terminal 1100 includes a processor 1101 and a memory device 1102.

The processor 1101 may include one or more processing cores, such as a 4-core processor and an 11-core processor. The processor 1101 may be formed by at least one hardware of a DSP (Digital Signal Processing), an FPGA (Field-Programmable Gate Array), and a PLA (Programmable Logic Array).

The memory device 1102 may include one or more computer-readable storage media, which can be non-transitory. The memory device 1102 may also include a high-speed random-access memory device, as well as a non-volatile memory, such as one or more disk storage devices and flash storage devices. In some embodiments, the non-transitory computer-readable storage medium in the memory device 1102 is configured to store at least one instruction. The at least one instruction is configured to be executed by the processor 1101 to implement the novel device establishment provided by the method embodiments of the present disclosure.

In some embodiments, the terminal 1100 also optionally includes a peripheral device interface 1103 and at least one peripheral device. The processor 1101, the memory device 1102, and the peripheral device interface 1103 may be connected by a bus or a signal line. Each peripheral device may be connected to the peripheral device interface 1103 by a bus, a signal line or a circuit board. For example, the peripheral device includes at least one of a radio frequency circuit 1104, a touch display screen 1105, a camera 1106, an audio circuit 1107, a positioning component 1108 and a power source 1109.

The peripheral device interface 1103 may be configured to connect at least one peripheral device associated with an I/O (Input/Output) to the processor 1101 and the memory device 1102. In some embodiments, the processor 1101, the memory device 1102 and the peripheral device interface 1103 are integrated on the same chip or circuit board. In some other embodiments, any one or two of the processors 1101, the memory device 1102 and the peripheral device interface 1103 may be implemented on a separate chip or circuit board, which is not limited in the present embodiment.

The radio frequency circuit 1104 is configured to receive and transmit an RF (Radio Frequency) signal, which is also referred to as an electromagnetic signal.

In some embodiments, terminal 1100 also includes one or more sensors 1110. The one or more sensors 1110 include, but not limited to, an acceleration sensor 1111, a gyro sensor 1112, a pressure sensor 1113, a fingerprint sensor 1114, an optical sensor 1115 and a proximity sensor 1116.

It will be understood by those skilled in the art that the structure shown in FIG. 11 does not constitute a limitation to the terminal 1100, and may include more or less components than those illustrated, or combine some components or adopt different component arrangements.

It should be understood by those skilled in the art that, all or part of the steps of any of the methods in the above embodiments may be implemented through programs that give instructions to respective hardware. The programs may be stored in a computer-readable storage medium. The computer-readable storage medium may be the computer-readable storage medium included in the memory device in the foregoing embodiment, or may be a computer-readable storage medium that exists separately and is unassembled in the terminal. The computer-readable storage medium stores at least one instruction, at least one program, a code set or an instruction set which is loaded and executed by the processor to implement the method for constructing a novel device as shown in FIG. 4 or FIG. 5.

In some embodiments of the present disclosure, a non-transitory computer-readable storage medium is provided. The computer-readable storage medium includes executable instructions which are called and executed by a processor to implement steps of the novel device construction method described above.

In some embodiments, the computer-readable storage medium may include a read-only memory (ROM), a random-access memory (RAM), a solid-state drive (SSD), an optical disk or the like. The RAM may include a resistance RANI (ReRAM) and a dynamic RAM (DRAM).

In some embodiments of the methods, the acquiring the function models corresponding to the at least one physical device includes:

acquiring respective capability information of at least two physical devices, the capability information being configured to indicate at least one function of the physical device that corresponds to the capability information; and creating the function models according to the respective capability information of the at least two physical devices.

In some embodiments, prior to acquiring the construction rule for the target novel device, the method further includes:

acquiring model requirement information of each of novel devices, the model requirement information being configured to indicate a function type of a function model required for constructing the novel device that corresponds to the model requirement information;

determining, from each of the novel devices, at least one novel device whose corresponding model requirement information matches all or part of the function models as a candidate novel device; and determining the target novel device from the candidate novel device.

In some embodiments, determining the target novel device from the candidate novel device when the candidate novel device includes at least two novel devices includes:

displaying a novel device construction interface, the novel device construction interface comprising respective construction trigger controls for the at least two novel devices; and determining the novel device corresponding to a construction trigger control that receives a user operation as the target novel device.

In some embodiments, the method includes:

selecting the at least one function model for constructing the target novel device from the function models according to model requirement information of the target novel device, wherein the model requirement information is configured to indicate a function type of a function model required for constructing the novel device that corresponds to the model requirement information.

In some embodiments, prior to constructing the target novel device on the basis of the at least one of the function models according to the construction rule, the method further includes:

displaying a model selection interface of the target novel device, the model selection interface comprising a model selection control of the at least one function model for constructing the target novel device; and determining at least two function models for constructing the target novel device from the function models according to trigger operations on model selection controls of the at least two function models.

In some embodiments, acquiring the construction rule for the target novel device when the target novel device corresponds to at least two function models includes:

acquiring a combination rule for the target novel device, the combination rule being configured to indicate a manner for combining the at least two function models in the function models; and constructing the target novel device on the basis of the at least one of the function models according to the construction rule includes:

combining the at least two function models in the function models into the target novel device according to the combination rule for the target novel device, wherein a device function of the target novel device is achieved by combining functions to which the at least two function models respectively correspond.

In some embodiments, the combination rule for the target novel device includes a connection manner between the at least two function models; and combining the at least two function models in the function models into the target novel device according to the combination rule for the target novel device includes:

connecting the at least two function models through at least one coordinator according to the connection manner between the at least two function models, wherein the function model is a state machine model comprising at least two states, and the coordinator is configured to transmit an instruction for triggering a state change with the at least two function models.

In some embodiments, the acquiring the construction rule for the target novel device when the target novel device corresponds to a single function model includes:

acquiring a control rule for the target novel device, the control rule being configured to indicate a manner for controlling the single function model in the function models;

constructing the target novel device on the basis of the at least one of the function models according to the construction rule includes:

obtaining the target novel device by using a coordinator to connect the single function model, wherein a device function of the target novel device is achieved by controlling the single function model according to the control rule.

In some embodiments, the method further includes:

sending a control instruction corresponding to a target state to a physical device corresponding to a target model when a state of the target model changes, the control instruction being configured to instruct the physical device to trigger a function corresponding to the target model according to the target state, wherein the target model is any one of the function models corresponding to the target novel device, and the target state is a state after the target model changes.

In some embodiments, an apparatus for constructing a novel device is provided. The apparatus includes:

a model acquisition component configured to acquire function models corresponding to at least one physical device, each of the function models corresponding to a function of one physical device;

a rule acquisition component configured to acquire a construction rule for a target novel device; and a device construction component configured to construct the target novel device on the basis of at least one of the function models according to the construction rule.

In some embodiments, the model acquisition component includes:

an information acquisition sub-component configured to acquire respective capability information of at least two physical devices, the capability information being configured to indicate at least one function of the physical device that corresponds to the capability information; and a model creation sub-component configured to create the function models according to the respective capability information of each of the at least two physical devices.

In some embodiments, the apparatus further includes:

a requirement acquisition component configured to acquire model requirement information of each of novel devices prior to the acquisition of the construction rule for the target novel device, the model requirement information being configured to indicate a function type of a function model required for constructing the novel device that corresponds to the model requirement information;

a candidate device determination component configured to determine, from each of the novel devices, at least one novel device whose corresponding model requirement information matches all or part of the function models as a candidate novel device; and a target device determination component configured to determine the target novel device from the candidate novel device.

In some embodiments, the target device determination component includes:

an interface display sub-component configured to display a novel device construction interface when the candidate novel device includes at least two novel devices, the novel device construction interface comprising respective construction trigger controls for the at least two novel devices; and a target device determination sub-component configured to determine the novel device corresponding to a construction trigger control that receives a user operation as the target novel device.

In some embodiments, the apparatus further includes:

a model selection component configured to select the at least one function model for constructing the target novel device from the function models according to model requirement information of the target novel device, wherein the model requirement information is configured to indicate a function type of a function model required for constructing the novel device that corresponds to the model requirement information.

In some embodiments, the apparatus further includes:

a selection interface display component configured to display a model selection interface of the target novel device prior to the construction of the target novel device on the basis of the at least one of the function models according to the construction rule, the model selection interface comprising a model selection control of the at least one function model for constructing the target novel device; and a model determination component configured to determine at least two function models for constructing the target novel device from the function models according to trigger operations on model selection controls of the at least two function models.

In some embodiments, the rule acquisition component includes:

a combination rule acquisition sub-component configured to acquire a combination rule for the target novel device when the target novel device corresponds to at least two function models, the combination rule being configured to indicate a manner for combining the at least two function models in the function models; and the device construction component includes:

a device combination sub-component configured to combine the at least two function models in the function models into the target novel device according to the combination rule for the target novel device, wherein a device function of the target novel device is achieved by combining functions to which the at least two function models respectively correspond.

In some embodiments, the combination rule for the target novel device includes a connection manner between the at least two function models; and the device combination sub-component includes:

a model connection sub-component configured to connect the at least two function models through at least one coordinator according to the connection manner between the at least two function models, wherein the function model is a state machine model comprising at least two states, and the coordinator is configured to transmit an instruction for triggering a state change with the at least two function models.

In some embodiments, the rule acquisition component includes:

a control rule acquisition sub-component configured to acquire a control rule for the target novel device when the target novel device corresponds to a single function model, the control rule being configured to indicate a manner for controlling the single function model in the function models; and the device construction component includes:

a device obtaining sub-component configured to obtain the target novel device by using a coordinator to connect the single function model, wherein a device function of the target novel device is achieved by controlling the single function model according to the control rule.

In some embodiments, the apparatus further includes:

an instruction sending component configured to send a control instruction corresponding to a target state to a physical device corresponding to a target model when a state of the target model changes, the control instruction being configured to instruct the physical device to trigger a function corresponding to the target model according to the target state, wherein the target model is any one of the function models corresponding to the target novel device, and the target state is a state after the target model changes.

Various embodiments of the present disclosure can have one or more of the following advantages.

The function models corresponding to the at least one physical device are acquired, wherein each of the function models corresponds to the function of one physical device; then, the construction rule for the target novel device is acquired; and finally, the target novel device is constructed on the basis of the at least one of the function models according to the construction rule. Through the above solution, the novel model device can be obtained by acquiring the function models from the physical device and constructing the function models, so that functions achievable by the physical device are extended.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with some embodiments or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for constructing a novel device, comprising:
   acquiring function models corresponding to at least one physical device, each of the function models corresponding to a function of one physical device;
   acquiring a construction rule for a target novel device; and
   constructing the target novel device based on at least one of the function models according to the construction rule,
   wherein in a case that the target novel device corresponds to at least two function models, the acquiring the construction rule for the target novel device comprises:
   acquiring a combination rule for the target novel device, wherein the combination rule is configured to indicate a manner for combining the at least two function models in the function models and comprises a connection manner between the at least two function models, wherein the at least two function models are from at least two separate physical devices, and the connection manner indicates that any of the at least two function models is connected to another function model, or to a novel device formed by connecting and combining function models; and
   constructing the target novel device based on the at least one of the function models according to the construction rule comprises:
   obtaining the target novel device by connecting the at least two function models through at least one coordinator according to the connection manner between the at least two function models, wherein a device function of the target novel device is achieved by combining functions to which the at least two function models respectively correspond,
   wherein the function model is a state machine model comprising at least two states, and the coordinator is configured to transmit an instruction for triggering a state change to the at least two function models;
   wherein the acquiring the function models corresponding to the at least one physical device comprises:
   acquiring respective capability information of at least two physical devices, the capability information being configured to indicate at least one function of the physical device that corresponds to the capability information; and
   creating the function models according to the respective capability information of the at least two physical devices;
   the method further comprising displaying the constructed novel device and associated physical device information.

2. The method according to claim 1, wherein prior to the acquiring the construction rule for the target novel device, the method further comprises:
   acquiring model requirement information of each of novel devices, the model requirement information being configured to indicate a function type of a function model required for constructing the novel device that corresponds to the model requirement information;
   determining, from each of the novel devices, at least one novel device whose corresponding model requirement information matches all or part of the function models as a candidate novel device; and
   determining the target novel device from the candidate novel device.

3. The method according to claim 2, wherein in a case that the candidate novel device comprises at least two novel devices, the determining the target novel device from the candidate novel device comprises:
  displaying a novel device construction interface, the novel device construction interface comprising respective construction trigger controls for the at least two novel devices; and
  determining the novel device corresponding to a construction trigger control that receives a user operation as the target novel device.

4. The method according to claim 1, further comprising:
  selecting the at least one function model for constructing the target novel device from the function models according to model requirement information of the target novel device,
  wherein the model requirement information is configured to indicate a function type of a function model required for constructing the novel device that corresponds to the model requirement information.

5. The method according to claim 1, wherein prior to the constructing the target novel device based on the at least one of the function models according to the construction rule, the method further comprises:
  displaying a model selection interface of the target novel device, the model selection interface comprising a model selection control of the at least one function model for constructing the target novel device; and
  determining at least two function models for constructing the target novel device from the function models according to trigger operations on model selection controls of the at least two function models.

6. The method according to claim 1, wherein in a case that the target novel device corresponds to a single function model, the acquiring the construction rule for the target novel device comprises:
  acquiring a control rule for the target novel device, the control rule being configured to indicate a manner for controlling the single function model in the function models;
  constructing the target novel device based on the at least one of the function models according to the construction rule comprises:
  obtaining the target novel device by using a coordinator to connect the single function model, wherein a device function of the target novel device is achieved by controlling the single function model according to the control rule.

7. The method according to claim 1, further comprising:
  sending a control instruction corresponding to a target state to a physical device corresponding to a target model in response to that a state of the target model changes, the control instruction being configured to instruct the physical device to trigger a function corresponding to the target model according to the target state,
  wherein the target model is any one of the function models corresponding to the target novel device, and the target state is a state after the target model changes.

8. The method according to claim 2, wherein the model requirement information is customized by a user through a display interface.

9. An apparatus for constructing a novel device construction, comprising:
  a processor; and
  a memory device configured to store instructions executable by the processor,
  wherein the processor is configured to:
  acquire function models corresponding to at least one physical device, each of the function models corresponding to a function of one physical device;
  acquire a construction rule for a target novel device;
  construct the target novel device based on at least one of the function models according to the construction rule;
  in a case that the target novel device corresponds to at least two function models, acquire a combination rule for the target novel device, wherein the combination rule is configured to indicate a manner for combining the at least two function models in the function models and comprises a connection manner between the at least two function models, wherein the at least two function models are from at least two separate physical devices, and the connection manner indicates that any of the at least two function models is connected to another function model, or to a novel device formed by connecting and combining function models; and
  obtain the target novel device by connecting the at least two function models through at least one coordinator according to the connection manner between the at least two function models, wherein a device function of the target novel device is achieved by combining functions to which the at least two function models respectively correspond,
  wherein the function model is a state machine model comprising at least two states, and the coordinator is configured to transmit an instruction for triggering a state change to the at least two function models;
  wherein the processor is configured to acquire the function models corresponding to the at least one physical device based on operations comprising:
  acquiring respective capability information of at least two physical devices, the capability information being configured to indicate at least one function of the physical device that corresponds to the capability information; and
  creating the function models according to the respective capability information of the at least two physical devices;
  wherein the processor is further configured to render displaying the constructed novel device and associated physical device information.

10. The apparatus according to claim 9, wherein the processor is further configured to:
  acquire respective capability information of at least two physical devices, the capability information being configured to indicate at least one function of the physical device that corresponds to the capability information; and
  create the function models according to the respective capability information of the at least two physical devices.

11. The apparatus according to claim 9, wherein the processor is further configured to:
  acquire model requirement information of each of novel devices prior to the acquisition of the construction rule for the target novel device, the model requirement information being configured to indicate a function type of a function model required for constructing the novel device that corresponds to the model requirement information;
  determine, from each of the novel devices, at least one novel device whose corresponding model requirement information matches all or part of the function models as a candidate novel device; and determine the target novel device from the candidate novel device.

12. The apparatus according to claim 11, wherein the processor is further configured to:
in a case that the candidate novel device comprises at least two novel devices, display a novel device construction interface, the novel device construction interface comprising respective construction trigger controls for the at least two novel devices; and
determine the novel device corresponding to a construction trigger control that receives a user operation as the target novel device.

13. The apparatus according to claim 9, wherein the processor is further configured to select the at least one function model for constructing the target novel device from the function models according to model requirement information of the target novel device,
wherein the model requirement information is configured to indicate a function type of a function model required for constructing the novel device that corresponds to the model requirement information.

14. The apparatus according to claim 9, wherein the processor is further configured to:
display a model selection interface of the target novel device prior to the construction of the target novel device based on the at least one of the function models according to the construction rule, the model selection interface comprising a model selection control of the at least one function model for constructing the target novel device; and
determine at least two function models for constructing the target novel device from the function models according to trigger operations on model selection controls of the at least two function models.

15. The apparatus according to claim 9, wherein the processor is further configured to send a control instruction corresponding to a target state to a physical device corresponding to a target model in response to that a state of the target model changes, the control instruction being configured to instruct the physical device to trigger a function corresponding to the target model according to the target state,
wherein the target model is any one of the function models corresponding to the target novel device, and the target state is a state after the target model changes.

16. The apparatus according to claim 9, wherein the processor is further configured to:
in a case that the target novel device corresponds to a single function model, acquire a control rule for the target novel device, the control rule being configured to indicate a manner for controlling the single function model in the function models; and
obtain the target novel device by using a coordinator to connect the single function model, wherein a device function of the target novel device is achieved by controlling the single function model according to the control rule.

17. An Internet of Things (IoT) system implementing the method according to claim 1, comprising a plurality of physical devices and a mobile terminal, wherein the terminal is configured to:
acquire function models respectively corresponding to the plurality of physical devices;
obtain the construction rule for the target novel device; and
construct the target novel device based on the function models according to the construction rule, thereby extending functions of the plurality of physical devices;
wherein:
in a case that the target novel device corresponds to at least two function models, the acquiring the construction rule for the target novel device comprises:
acquiring a combination rule for the target novel device, wherein the combination rule is configured to indicate a manner for combining the at least two function models in the function models and comprises a connection manner between the at least two function models, wherein the at least two function models are from at least two separate physical devices, and the connection manner indicates that any of the at least two function models is connected to another function model, or to a novel device formed by connecting and combining function models; and
constructing the target novel device based on the at least one of the function models according to the construction rule comprises:
obtaining the target novel device by connecting the at least two function models through at least one coordinator according to the connection manner between the at least two function models, wherein a device function of the target novel device is achieved by combining functions to which the at least two function models respectively correspond,
wherein the function model is a state machine model comprising at least two states, and the coordinator is configured to transmit an instruction for triggering a state change to the at least two function models;
wherein the terminal is configured to acquire the function models corresponding to the plurality of physical devices based on operations comprising:
acquiring respective capability information of at least two physical devices, the capability information being configured to indicate at least one function of the physical device that corresponds to the capability information; and
creating the function models according to the respective capability information of the at least two physical devices;
wherein:
the plurality of physical devices include a TV and a smart speaker;
the mobile terminal is configured to acquire an audio and video playback function model of the TV and a voice recognition function model of the smart speaker, or an image playback function model of the TV and the voice recognition function model and the sound playback function model of the smart speaker;
the target novel device comprises at least one of:
a first novel device, in which the smart speaker performs voice recognition and the TV performs audio and video playback; and
a second novel device in which the smart speaker performs voice recognition, the TV performs image playback, and the smart speaker performs sound playback; and
the mobile terminal comprises a display screen configured to display the first and second novel devices and associated physical device information.

* * * * *